(12) United States Patent
Safai et al.

(10) Patent No.: US 7,765,853 B2
(45) Date of Patent: Aug. 3, 2010

(54) DETERMINING SEAL FEATURE INTEGRITY BY TESTING FOR DEFORMATION UPON AIR PRESSURE EXCITATION

(75) Inventors: Morteza Safai, Seattle, WA (US); Gary E. Georgeson, Federal Way, WA (US); James H. Lee, Ravensdale, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/757,589

(22) Filed: Jun. 4, 2007

(65) Prior Publication Data

US 2008/0295579 A1    Dec. 4, 2008

(51) Int. Cl.
*G01M 3/04* (2006.01)
(52) U.S. Cl. .......................................... 73/40
(58) Field of Classification Search .................. 73/40; 137/15.11
See application file for complete search history.

(56) References Cited

U.S. PATENT DOCUMENTS

| | | | |
|---|---|---|---|
| 5,257,088 A | 10/1993 | Tyson, II et al. | |
| 6,040,900 A | 3/2000 | Chen | |
| 6,246,483 B1 | 6/2001 | Smith et al. | |
| 6,717,681 B1 | 4/2004 | Bard et al. | |
| 2003/0037604 A1 | 2/2003 | Poblete | |

FOREIGN PATENT DOCUMENTS

| | | |
|---|---|---|
| DE | 19646876 | 12/1997 |
| WO | WO92/11506 A1 | 7/1992 |

OTHER PUBLICATIONS

Y.Y. Hung et al., "Shearography: An Optical measurement Technique and Applications," Materials Science and Engineering R: Reports, vol. 49, No. 3, Apr. 21, 2005, pp. 61-87, ISSN: 0927-796X, Elsevier Sequoia, S.A., Lausanne, CH.

*Primary Examiner*—Hezron Williams
*Assistant Examiner*—Alex Devito

(57) ABSTRACT

Optical metrology methods, apparatuses, and systems for detecting seal integrity. These comprise changing an air pressure inside a chamber to an excitation pressure level when the chamber is placed over a segment of a surface of a structure having one or more seal features and determining whether the integrity of any of the one or more seal features has been compromised by determining, using an optical system, whether any of the one or more seal features have been deformed by the changing of the air pressure.

21 Claims, 3 Drawing Sheets

DETERMINING SEAL FEATURE INTEGRITY BY TESTING FOR DEFORMATION UPON AIR PRESSURE EXCITATION

FIELD OF THE INVENTION

Embodiments of the disclosure relate to field of manufacturing and, more particularly, to optical metrology methods, apparatuses, and systems for verifying seal feature integrity by detecting seal feature deformation in response to changes in air pressure.

BACKGROUND OF THE INVENTION

In a number of manufacturing situations, seal features such as caps and sealant are often placed over fastener ends and nuts, e.g., inside composite fuel tanks in aircraft in order to prevent discharges from lighting strikes from transferring from the fastener into the fuel tank. A lack of a physical bond between the sealant and the interior (as in the composite fuel tank example), or cracks in the seal feature, may reduce the level of protection. Other than visual inspection by human inspectors, there is no known method of inspecting the seal features either during manufacture or in an operational situation (especially in the case of an aircraft) to determine whether the integrity of the seal features has been compromised.

SUMMARY OF THE INVENTION

Embodiments of the present invention solve the problem of automating the process of determining seal feature integrity (e.g., in composite fuselage aircraft) using optical metrology techniques such as electrical shearography or speckle shearing interferometry to determine whether a change in air pressure, such as a reduction in air pressure, causes a deformation of seal features. If a deformation is detected, it may be determined that the integrity of the seal feature is sound. If no deformation is detected, it may be determined that the integrity of the seal feature has been compromised.

Embodiments of the present invention include a method of detecting seal integrity involving changing an air pressure inside a chamber to an excitation pressure level where the chamber is placed over a segment of a surface of a structure such as, for example, the interior of a composite fuselage, having one or more seal features and determining whether the integrity of any of the one or more seal features has been compromised. This can be done by determining, using an optical system, whether any of the one or more seal features have been deformed by the changing of the air pressure.

Embodiments include imaging the seal features such as seal caps and sealant, using a camera, after changing the air pressure to create a post-excitation image and comparing the post-excitation image(s) to one or more reference images of the one or more seal features imaged while the chamber is at a reference air pressure level. This comparison may allow the optical system to determine if the seal features have been deformed by the change in air pressure.

Embodiments include determining whether there are any out-of-plane deformations of any of the one or more seal features. Embodiments include performing electronic shearography on the one or more seal features.

Embodiments of the present invention utilize a diode laser within the chamber and a camera having shearing optics comprised of either birefringence materials or two 45 degree beam splitters.

Embodiments of the present invention include an apparatus comprising a chamber having an interior and an opening adapted to be placed over a surface segment of a structure having one or more seal features and shearing optics disposed within the chamber and adapted to convey light from the interior of the chamber to an imaging system adapted to capture the conveyed light and image a post-excitation image of the one or more seal features after a change of an air pressure within the interior of the chamber to an excitation pressure level. The imaging system may be capable, in embodiments, of determining, based at least in part on the post-excitation image, whether the integrity of any of the one or more seal features has been compromised by determining whether any of the one or more seal features have been deformed by the change of the air pressure within the interior of the chamber.

Embodiments of the present invention include the imaging system having a camera and a lens where the camera is optically coupled to the shearing optics through the lens and is adapted to capture the conveyed light and image the post-excitation image.

In embodiments, the camera is adapted to transmit, either wirelessly or via a wired connection, the post-excitation image to an imaging processor adapted to process the post-excitation image to determine whether the integrity of one or more seal features has been compromised. In embodiments, the camera comprises the imaging processor.

In embodiments, the imaging system may be further adapted to determine whether the integrity of any of the one or more seal features have been compromised by comparing the post-excitation image to one or more reference images of the one or more seal features imaged while the air pressure inside the chamber is at a reference air pressure level.

Embodiments may include an edge seal member surrounding an outer edge of the opening of the chamber and adapted to assist creation of an air-tight seal between the chamber and the surface segment. Embodiments may include a coherent light source disposed within the interior of the chamber to generate a coherent light to be reflected off of the one or more seal features and be conveyed by the shearing optics.

Embodiments include a vacuum line and an attached vacuum pump outside of the chamber with the vacuum line connecting the vacuum pump to the interior of the chamber. The vacuum pump may be adapted to cause the excitation pressure level by withdrawing air from the chamber, and wherein the reference pressure level is equal to an ambient pressure level.

Embodiments include systems including an imaging system to capture a post-excitation image of one or more seal features of a surface segment with coherent light conveyed through shearing optics when the one or more seal features have been subjected to an excitation air pressure level. Embodiments also include an image processor operatively coupled to the imaging system and adapted to process the post-excitation image to determine whether the integrity of any of the one or more seal features has been compromised by determining whether any of the one or more seal features have been deformed by the subjection to the excitation air pressure level.

In embodiments, systems include a chamber adapted to be placed over a surface segment of a structure having the one or more seal features, the chamber comprising an opening, a vacuum pump for lowering an air pressure within an interior of the chamber, and shearing optics disposed in the interior of the chamber.

Embodiments include systems having a camera and a lens, said camera and lens optically coupled to the shearing optics and adapted to capture the post-excitation image. In embodiments, the image processor is further adapted to determine whether any of the one or more seal features have been compromised by comparing the post-excitation image to one or more reference images imaged while the seal features have been subjected to a reference air pressure level.

BRIEF DESCRIPTION OF THE DRAWINGS

Embodiments of the disclosure will be readily understood by the following detailed description in conjunction with the accompanying drawings. Embodiments of the disclosure are illustrated by way of example and not by way of limitation in the figures of the accompanying drawings.

DETAILED DESCRIPTION

In the following detailed description, reference is made to the accompanying drawings which form a part hereof, and in which is shown by way of illustration embodiments of the disclosure. It is to be understood that other embodiments may be utilized and structural or logical changes may be made without departing from the scope of the disclosure. Therefore, the following detailed description is not to be taken in a limiting sense, and the scope of embodiments in accordance with the disclosure is defined by the appended claims and their equivalents.

Various operations may be described as multiple discrete operations in turn, in a manner that may be helpful in understanding various embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of the embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)." For the purposes of the description, a phrase in the form "at least one of A, B, and C" means "(A), (B), (C), (A and B), (A and C), (B and C), or (A, B and C)." For the purposes of the description, a phrase in the form "(A)B" means "(B) or (AB)," that is, A is an optional element.

The description may use the phrases, "various embodiments," "in an embodiment," or "in embodiments," which may each refer to one or more of the same or different embodiments. Furthermore, the terms "comprising," "including," "having," and the like, as used with respect to embodiments as described in the present disclosure, are synonymous.

Figure 1:
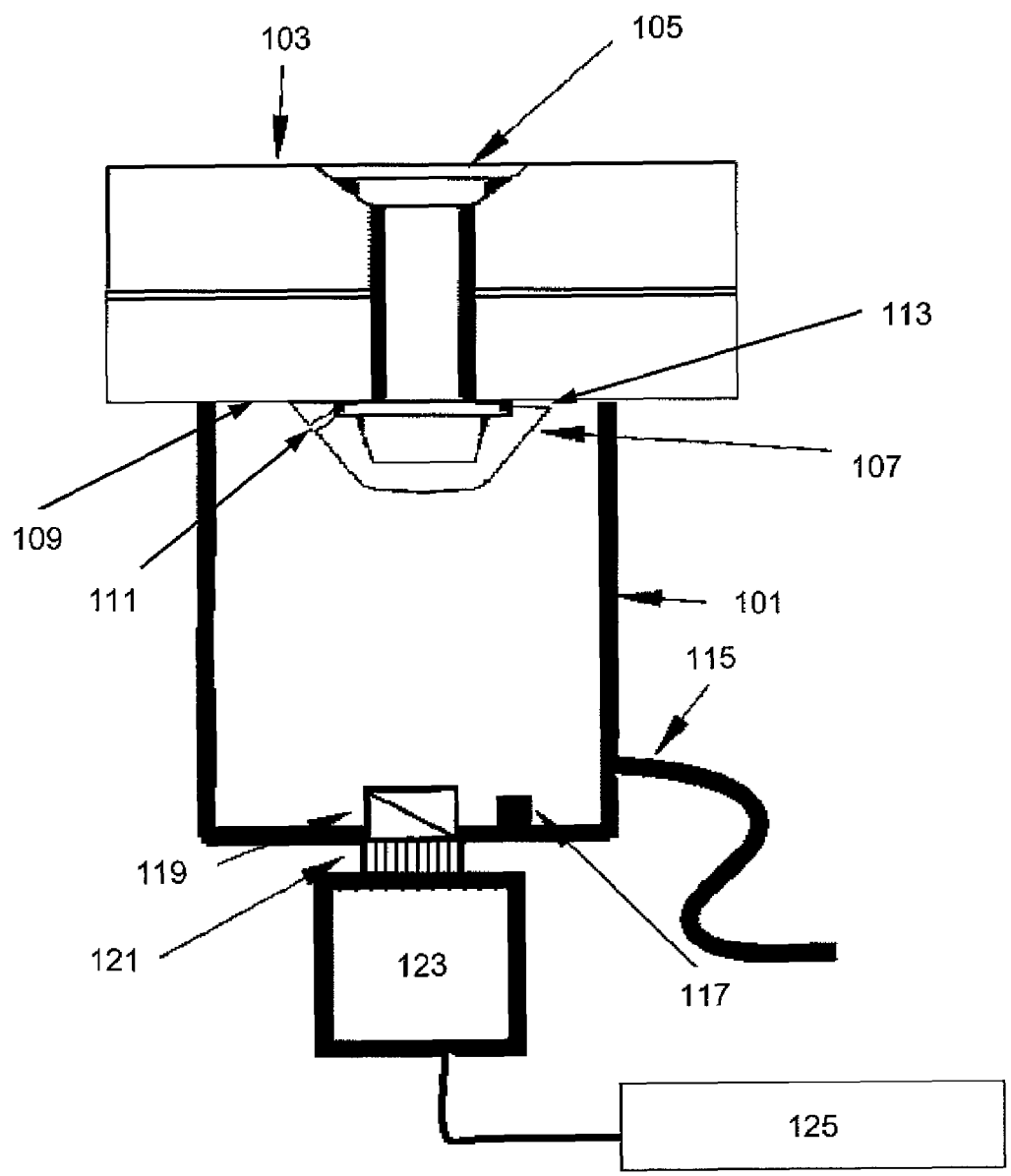
FIG. 1 depicts an inspection head apparatus utilizing a vacuum chamber and shearing optics to detect seal cap integrity in accordance with various embodiments.

FIG. 1 depicts an inspection head apparatus with shearing optics in accordance with various embodiments of the present invention. Vacuum chamber 101 is shown placed against surface segment 103 with fastener 105 and seal feature 107. Surface segment 103 may be part of an interior of a composite fuselage of an aircraft or other surface. In embodiments, seal feature 107 may be, for example, a seal cap and may, in embodiments, prevent discharges such as lightning discharges from transferring between fastener 105 and an interior of a composite fuselage. The interior of the fuselage may contain liquid or gaseous fuel materials and lightning discharges may potentially create a fire or explosive danger within the fuselage. Seal feature 107 is shown in FIG. 1 with through-crack 111 and poor seal bond 113. However, not all seal features have either a crack or a poor seal bond and it is the purpose of the present invention to, among other things, detect the existence of seal feature cracks, poor seal bonds, sealant/structure disbonds, or other conditions of seal feature 107 that may compromise protective integrity.

Vacuum chamber 101 may have opening 109 and vacuum chamber 101 may be placed against surface segment 103 such that opening 109 is flush with surface segment 103. In embodiments, an edge seal feature or fitting such as, for example, a rubber gasket (not shown), may be utilized to assist the formation of an air-tight seal between vacuum chamber 101 and surface segment 103 which may be contoured. In embodiments, such an edge seal feature or fitting may be removable. In embodiments, multiple edge seal features or fittings may be available to assist the creation of an air-tight seal against surface segment 103. For example, surface segment 103 may be a particular shape such as, for example, concave, convex, or other shape and a corresponding concave, convex edge, or other shaped seal feature or fitting may be used to match the particular contour of surface segment 103. One of ordinary skill in the art will recognize that embodiments of the present invention are not limited to any one particular edge seal feature or fitting shape. In embodiments, vacuum chamber 101 may be completely impenetrable by light from the visible spectrum and may be air-tight when sealed against a surface. In embodiments, opening 109 of vacuum chamber 101 may be wide enough to cover one or more seal features in addition to seal feature 107.

Vacuum line 115 may connect the interior of vacuum chamber 101 to a vacuum pump (not shown) or other suitable device for changing the air pressure within vacuum chamber 101 to an excitation air pressure level when placed against surface segment 103. In embodiments, the excitation air pressure level may be changed to a level above or below an ambient air pressure level. In embodiments, the ambient air pressure level may be equal to the air pressure of the surrounding environs such as the air pressure acting on the exterior of surface segment 103. In embodiments, the air pump may be adapted to raise or lower the air pressure within vacuum chamber 101 to an excitation air pressure level higher or lower than the ambient air pressure. In embodiments, the air pump may be able to further raise or lower the air pressure within vacuum chamber 101 to a reference air pressure level higher or lower than either the ambient air pressure or the excitation air pressure level. In embodiments, the excitation air pressure level and reference air pressure level may both be higher than the ambient air pressure level. In embodiments, the excitation air pressure level and the reference air pressure level may be lower than the ambient air pressure level. In embodiments, the excitation air pressure level may be higher than, and the reference air pressure level may be lower than, the ambient air pressure level. In embodiments, the excitation air pressure level may be lower than, and the reference air pressure level may be higher than, the ambient air pressure.

In embodiments, coherent light source 117 may be disposed within vacuum chamber 101. In embodiments, coherent light source 117 may be a diode laser or any other device capable of producing coherent light, single frequency light, or monochromatic light where all polarization vectors are the same. In embodiments, shearing optics 119 may be disposed within the interior of vacuum chamber 101. In embodiments, shearing optics 119 may be disposed on a surface edge of vacuum chamber 101 such that it may be optically coupled to lens 121 which may or may not be outside of vacuum chamber 101.

In embodiments, camera 123 may be attached to lens 121 and optically coupled to shearing optics 119. Shearing optics may be made of either birefringence materials or of two 45 degree beam splitters or other suitable shearing optics known to those of ordinary skill in the art such as a spherical mirror. In embodiments, camera 123 may be for example, a Charge Coupled Device (CCD) or Complementary metal-oxide-semiconductor (CMOS) camera, or other digital or analog camera device. In embodiments, shearing optics 119, lens 121 and camera 123 may be moved to an interior or exterior side wall of vacuum chamber 101.

In embodiments, camera 123 may be connected to computer image subtraction and imaging processor 125 which may comprise, for example, a digital signal processor. In embodiments, this connection may be by a wireless or wired connection. In embodiments, camera 123 may contain its own computer image subtraction and imaging processor and thus the apparatus shown in FIG. 1 may be a stand-alone device without need to connect to a separate processor. In embodiments, the camera may be a smart camera capable of performing the imaging and image subtraction process. Such a smart camera may, in embodiments, be capable of performing these and other processes automatically. An example of a smart camera may be a Sony™ XC1-V3 camera or other camera. In embodiments, camera 123 may be battery powered which may, in embodiments, allow the apparatus shown in FIG. 1 to be mobile and therefore easily brought into a fuselage of an aircraft, for example.

When the pressure within vacuum chamber 101 is increased or decreased, it may cause seal feature 107 to deform. This deformation may be detected by superimposing two images together. The first image may be captured or imaged while the air pressure within the vacuum chamber is at a reference air pressure which may be, for example, an ambient air pressure level or other air pressure level. In embodiments, the image produced while the vacuum chamber is at a reference pressure may be a reference image. To capture this image, coherent light source 117 may be made to produce coherent light which may be reflected from seal feature 107; the reflected light may then pass through shearing optics 119, through lens 121 and into camera 123 where it may be imaged and captured.

In embodiments, an excitation image may be captured by following a similar procedure as above while the vacuum chamber is at an excitation air pressure such as, for example, a pressure level either lower or higher than the reference pressure. In embodiments, the reference pressure may be an ambient pressure and the excitation pressure may be a pressure lower than the ambient pressure. In this case, if the seal feature has good integrity, that is the integrity is not compromised, an out-of-plane expansion of seal feature 107 may be detected when subjected to the excitation pressure as opposed to when subjected to the reference or ambient pressure. This may be due to the fact that air flow around fastener 105 creates an equilibrium. In embodiments, air trapped behind seal feature 107 may generate an air pressure against the underside of seal feature 107. When this occurs while the pressure inside vacuum chamber 101 is also at an ambient air pressure, the pressure on both sides of seal feature 107 will be equal and no deformation will be visible. However, when the air pressure inside vacuum chamber 101 is lower than the air pressure outside surface segment 103, the air pressure acting against the fastener side of seal feature 107 will be greater than the air pressure acting on the opposite side of seal feature 107. When that occurs, there may be no deformation if the integrity of seal feature 107 has not been compromised.

On the other hand, in embodiments, if the integrity of the seal feature has been compromised, then air may leak through or around seal feature 107 when subjected to an excitation air pressure level generating an equilibrium and seal feature 107 therefore may not expand or deform when subjected to the excitation pressure. Thus, it may be determined, in embodiments, that a lack of visible or detected deformation or expansion of seal feature 107 indicates that seal feature 107 has a compromised integrity. In other words, if vacuum excitation produces no measurable strain on seal feature 107 it may be determined that the integrity of seal feature 107 has been compromised.

In embodiments, the pressure differential between the reference and the excitation air pressure levels may be small such as, for example, between 1-5 Pounds-per-square-inch (PSI). In embodiments, such low pressure differentials may not have a deleterious effect on the adhesion characteristics of seal feature 107.

In embodiments, the reference and excitation images may be processed by subtracting and/or superimposing them using computer image subtraction and imaging processor 125. In embodiments, this processing may involve electronic shearography, speckle shearing interferometry or other optical metrology techniques suitable and known in the art that measures out-of-plane or in-plane displacement or deformation of an object under strain. Embodiments of the present invention advantageously may not be effected by vibrations.

Figure 2A:
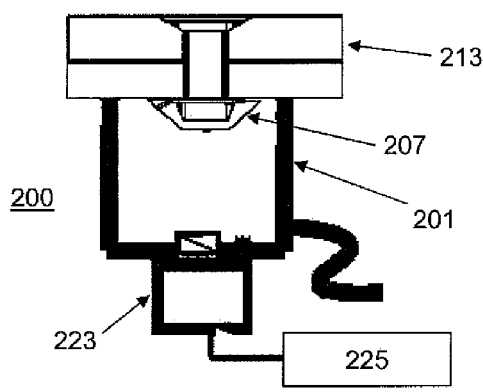
FIG. 2A depicts an inspection head apparatus in accordance with various embodiments of the present invention prior to vacuum excitation of a vacuum chamber.

FIG. 2A depicts an inspection head apparatus 200 prior to vacuum excitation in accordance with various embodiments. In the embodiment shown, the reference pressure within vacuum chamber 201 is an ambient air pressure level and seal feature 207 is shown not deformed or expanded because the air pressures acting against both sides of seal feature 207 are the same. In embodiments, this would be true whether seal feature 207 contains a through-crack or poor seal bond to the surface segment. A reference image may be, in embodiments, taken of seal feature 207 at this time using camera 223.

Figure 2B:
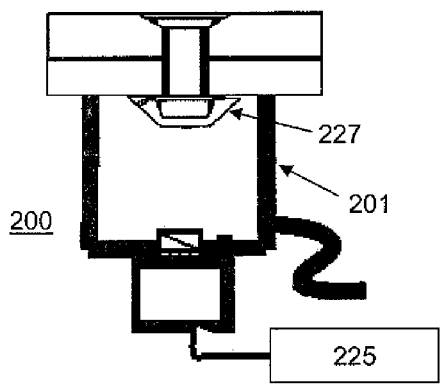
FIG. 2B depicts an inspection head apparatus in accordance with various embodiments after vacuum excitation showing a leaky seal cap.

FIG. 2B depicts an inspection head apparatus 200 having an excitation pressure level within the interior of vacuum chamber 201. In this case, fastener 205 has a compromised seal feature 227. In the embodiment shown, the excitation pressure level is a pressure lower than the reference pressure level which may be the ambient air pressure level. However, because compromised seal feature 227 is compromised, it may be allowing air to pass through it. Thus, seal feature 227 may not deform or expand despite the pressure level differential across compromised seal feature 227. Therefore, in embodiments, an excitation image taken of compromised seal feature 227 while exposed to an excitation pressure may not show any deformation or expansion. This may, in embodiments, signify that compromised seal feature 227 is compromised. Thus, computer image subtraction and imaging processor 225 may be able to detect, upon processing the reference and excitation images, that no expansion has occurred and indicate a compromised seal feature.

Figure 2C:
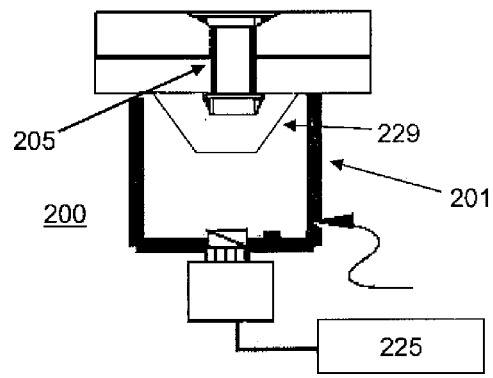
FIG. 2C depicts an inspection head apparatus in accordance with various embodiments after vacuum excitation showing a seal cap with good sealant integrity.

FIG. 2C depicts an inspection head apparatus 200 having an excitation pressure within the interior of vacuum chamber 201. However, unlike in FIG. 2B, fastener 205 has an uncompromised seal feature 229 covering it. Thus, uncompromised seal feature 229 may expand or deform. (Note that the deformation shown in FIG. 2C is exaggerated for purposes of illustration.) This may occur because air under seal feature 207 may not be able to pass into the vacuum chamber. Thus, the pressure differential across uncompromised seal feature 229 may cause uncompromised seal feature 229 to bulge, expand or deform or undergo an out-of-plane expansion in response to the excitation pressure. An excitation image taken of seal feature 227 while exposed to an excitation pressure may therefore, in embodiments, show deformation or expansion, indicating that uncompromised seal feature 229 is uncompromised or has good integrity. Thus, Computer image subtraction and imaging processor 225 may be able to detect, upon processing the reference and excitation images, that expansion has occurred and indicate that uncompromised seal feature 229 has good integrity.

Figure 3:
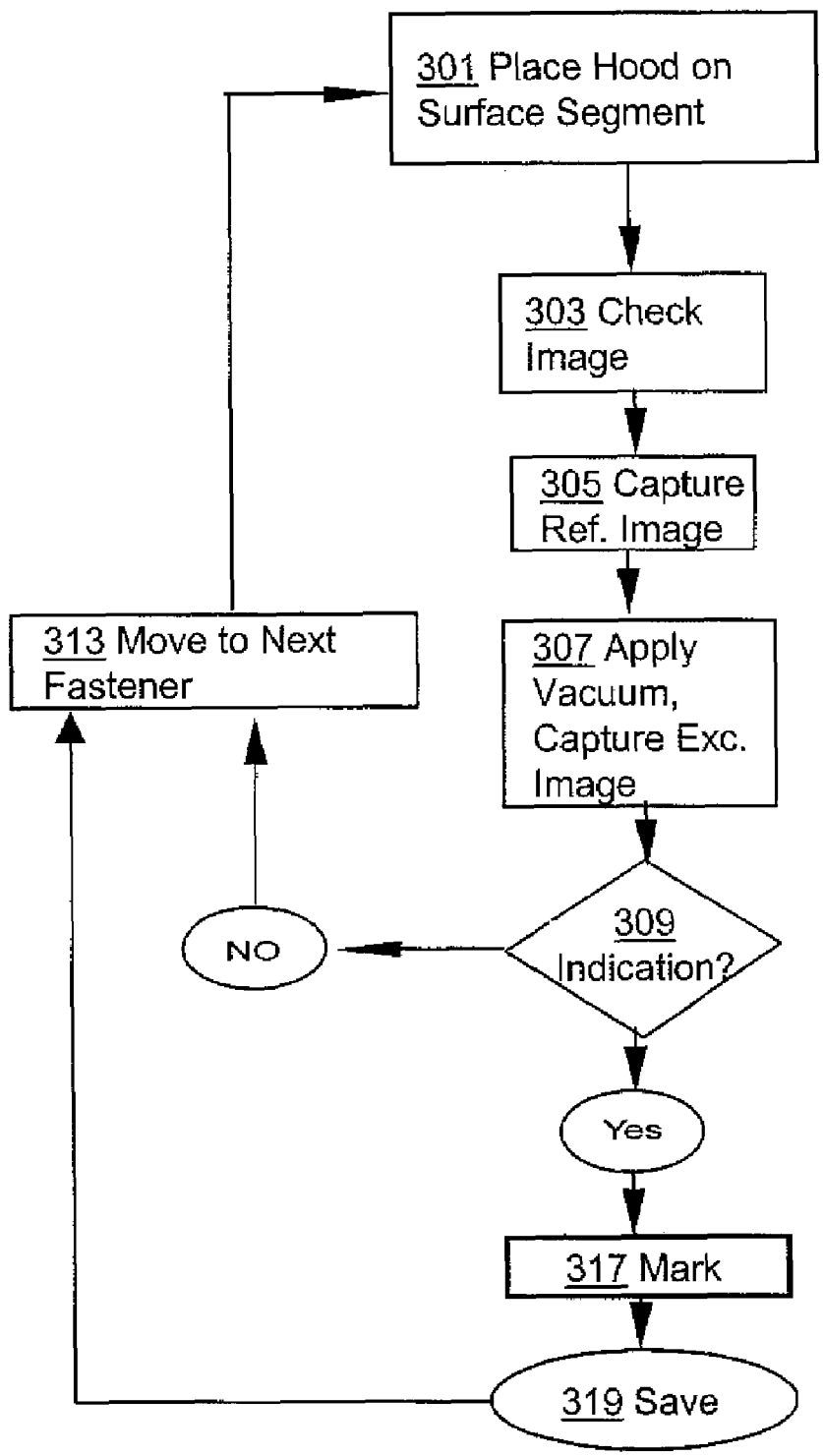
FIG. 3 depicts a flow diagram depicting a method of detecting seal feature integrity in accordance with various embodiments.

FIG. 3 depicts a flow chart of a method of detecting seal feature integrity in accordance with various embodiments. An inspection hood may be placed over seal feature 301. In embodiments, a proper vacuum seal may be insured at that time. An image processor may be used to check a real time image 303. A reference sheared image may be imaged or captured 305 while the interior of the vacuum chamber is at a reference pressure level which may be, in embodiments, an ambient air pressure level. Next, an excitation pressure level may be applied inside the vacuum chamber 307. At this point, a sheared post-excitation image may be imaged and image subtraction may be performed to compare the sheared reference image to a sheared post-excitation image. The image processor may next check to see if there is an indication of a compromised seal feature 309 by checking, for example, to see if the image subtraction indicates no out-of-plane deformation, or other deformations, of the seal feature upon being subjected to the excitation pressure.

In embodiments, if there is no indication of a compromised seal feature integrity, the process is repeated after moving the inspection hood to another fastener or group of fasteners 313. In embodiments, if there is an indication of compromised seal feature integrity, a mark may be placed on the fastener associated with the compromised seal feature 317 and the result saved and processed 319. From there, the process repeats on another fastener going back to 301 until all fasteners have been checked. Embodiments of the present invention may be practiced during manufacturing of the composite surface segments or during inspections of fully assembled aircraft by entering the fuselage or by accessing the interior of the wings through openings with removable covers that allow access.

In embodiments, some or all of the above may be automated. For example, after the apparatus has been placed over one or more seal features, an operator may, in embodiments, initiate a test. The apparatus may then automatically capture a first image, change the air pressure inside the chamber, and take a second image as a series of automated steps not requiring operator intervention. In embodiments, the apparatus may also automatically perform image subtraction and determine if the seal feature(s) have been compromised without operator intervention. In embodiments, it may automatically alert an operator if one or more seal features have been compromised and in embodiments it may automatically mark compromised seal features for further inspection without operator intervention. In embodiments, the apparatus may automatically display for an operator the image subtraction image or, alternatively, the reference image(s) and the post-excitation image(s) together or separately to allow the operator to determine whether the one or more seal features have been compromised. In embodiments, the apparatus may be communicatively coupled (such as, for example, wirelessly or otherwise) to a heads-up display that may be worn by an operator for viewing of the various images.

In embodiments, a seal integrity test pressure may be applied to the seal feature prior to applying the vacuum excitation pressure and capturing the excitation image. In embodiments, the seal integrity test pressure may be higher than the vacuum excitation pressure used to capture the excitation image. The seal integrity test pressure may be, for example, between 5 and 15 psi or other pressures and the vacuum excitation pressure used to capture the excitation image may be, for example, between 1 and 5 psi or other pressures. Embodiments of the present invention are not meant to be limited by any particular pressures or range of pressures. Applying the higher test pressure may compromise the feature allowing a weak but uncompromised seal bond to be detected by the subsequent application of vacuum excitation pressure. Without first applying the test pressure, a weak seal bond or a seal feature close to failure or compromise In this way, the integrity of the seal feature may be tested by determining if the seal feature has been compromised by the application of the test pressure.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

The invention claimed is:

1. A method of detecting seal integrity comprising:
    changing an air pressure inside a chamber to an excitation pressure level relative to a reference pressure level, said chamber placed over a segment of a surface of a structure having at least one seal feature; and
    determining that the integrity of the seal feature has not been compromised by determining, using an optical system, that the seal feature deforms by the changing of the air pressure.

2. The method of claim 1 further comprising imaging, using a camera, a post-excitation image of the seal feature while the air pressure inside the chamber is at the excitation pressure level, and wherein the determining the integrity of the seal feature comprises comparing the post-excitation image(s) to one or more reference images of the seal feature imaged while the air pressure inside the chamber is at the reference pressure level.

3. The method of claim 1 wherein the determining that the seal feature deforms comprises determining that there are any out-of-plane or in-plane deformations of the seal feature.

4. The method of claim 3 wherein the determining that the seal feature deforms comprises performing electronic shearography on the seal feature.

5. The method of claim 1 wherein the chamber comprises a diode laser and a camera having shearing optics comprised of either birefringence materials or two 45 degree beam splitters.

6. The method claim 1 wherein the reference pressure level is equal to an ambient air pressure level.

7. The method of claim 1 wherein the seal feature comprises a fastener seal cap and/or sealant and the surface of the structure is an interior surface of a composite airplane fuselage.

8. The method of claim 1 wherein the excitation air pressure level is a pressure level lower than the reference pressure level.

9. The method of claim 1 wherein the step of changing the air pressure inside the chamber to the excitation pressure level comprises withdrawing air from the chamber.

10. A method of detecting seal integrity of a seal feature, comprising:
    covering the seal feature by placing an opening of a vacuum chamber against a surface segment;
    changing an air pressure within the vacuum chamber to an excitation pressure level relative to a reference pressure level; and
    determining that the integrity of the seal feature has not been compromised by determining that the seal feature deforms by the changing of the air pressure inside the vacuum chamber.

11. The method of claim 10 wherein the step of changing the air pressure within the vacuum chamber to the excitation pressure level comprises:
    changing the air pressure within the vacuum chamber to a level that is one of higher and lower than an ambient air pressure.

12. The method of claim 11 wherein the ambient air pressure is equal to the air pressure acting on an exterior of the surface segment.

13. The method of claim 10 further comprising the step of:
    changing the air pressure within the vacuum chamber to the reference pressure level that is one of higher and lower than one of an ambient air pressure and the excitation pressure level.

14. The method of claim 13 wherein the step of determining that the integrity of the seal feature has not been compromised comprises:
    comparing an image of the seal feature at the excitation pressure level to an image of the seal feature at the reference pressure level.

15. The method of claim 10 further comprising the step of:
    producing light in the vacuum chamber using a coherent light source;
    reflecting the light off the seal feature;
    passing the reflected light through shearing optics and into a camera; and
    imaging the seal feature with the camera.

16. The method of claim 15 wherein the step of determining that the integrity of the seal feature has not been compromised comprises:
    imaging the seal feature at the reference pressure level within the vacuum chamber;
    imaging the seal feature at the excitation pressure level within the vacuum chamber; and
    processing the imaged seal feature at the reference pressure level and at the excitation pressure level.

17. The method of claim 16 wherein the step of processing the imaged seal feature at the reference pressure level and at the excitation pressure level comprises:
    subtracting the imaged seal feature at the reference pressure level from the imaged seal feature at the excitation pressure level using computer image subtraction.

18. The method of claim 16 wherein the step of processing the imaged seal feature at the reference pressure level and at the excitation pressure level comprises:
    performing one of electronic shearography and speckle shearing interferometry on the imaged seal features at the reference pressure level and at the excitation pressure level.

19. The method of claim 10 wherein the surface segment is contoured, the step of covering the seal feature by placing the opening of the vacuum chamber against the surface segment comprising:
    forming an air-tight seal between the vacuum chamber and the surface segment using an edge seal feature.

20. The method of claim 10 wherein the seal feature comprises at least one of a fastener seal cap and a sealant.

21. The method of claim 10 wherein the surface segment is an interior surface of an airplane fuselage.

* * * * *